United States Patent
Aiken (10) Patent No.: US 12,239,063 B1
(45) Date of Patent: Mar. 4, 2025

(54) PLANT GROWING SYSTEM AND KIT AND METHOD FOR SAME

(71) Applicant: John Edward Aiken, Monroeville, PA (US)

(72) Inventor: John Edward Aiken, Monroeville, PA (US)

( * ) Notice: Subject to any disclaimer, the term of this patent is extended or adjusted under 35 U.S.C. 154(b) by 0 days.

(21) Appl. No.: 18/772,501

(22) Filed: Jul. 15, 2024

(51) Int. Cl.
*A01G 9/02* (2018.01)
*B65D 1/12* (2006.01)
*B65D 25/22* (2006.01)
*B65D 25/32* (2006.01)
*B65D 77/04* (2006.01)
*B65D 85/52* (2006.01)

(52) U.S. Cl.
CPC ............... *A01G 9/024* (2013.01); *B65D 1/12* (2013.01); *B65D 25/22* (2013.01); *B65D 25/32* (2013.01); *B65D 77/04* (2013.01); *B65D 85/52* (2013.01); *B65D 2525/281* (2013.01)

(58) Field of Classification Search
CPC .......... A01G 9/024; A47G 7/04; A47G 7/044; A47G 2007/048; B65D 21/062; B65D 23/108; B65D 25/32; B65D 25/2802; B65D 25/2811; B65D 25/282
See application file for complete search history.

(56) References Cited

U.S. PATENT DOCUMENTS

| | | | | | |
|---|---|---|---|---|---|
| 98,291 | A | * | 12/1869 | Nashold | A47G 19/14 220/775 |
| 484,824 | A | * | 10/1892 | Shilling, Jr. | B65D 25/32 220/212.5 |
| 1,024,841 | A | * | 4/1912 | Emery | A47K 1/09 248/113 |
| 1,193,585 | A | * | 8/1916 | Martindale | B65D 25/42 220/772 |
| 2,564,043 | A | * | 8/1951 | Ward | A47J 45/10 248/113 |
| 4,823,433 | A | * | 4/1989 | Curtis | B44D 3/14 220/759 |
| 4,993,767 | A | * | 2/1991 | Song | A47J 45/10 220/759 |
| 6,863,191 | B2 | * | 3/2005 | Kesling | B44D 3/123 220/736 |
| 9,931,887 | B2 | * | 4/2018 | Eberly, Jr. | B44D 3/14 |
| 2018/0168114 | A1 | * | 6/2018 | McMurray | A01G 9/12 |
| 2021/0330099 | A1 | * | 10/2021 | Reiger | A47G 7/045 |

* cited by examiner

*Primary Examiner* — Kristen C Hayes (57) ABSTRACT

The present hanging system for growing a potted vegetable plant is generally a liquid-impervious container configured to be hung such that the plane of its bottom is tilted at an angle of 20 to 40 degrees from horizontal. Preferably, there is an optional soil-containing water-permeable inner container. Preferably, the liquid-impervious outer container is a pail (bucket) with a pivoting bail (handle) restrained by a tether to rotate a limited amount. The apparatus also incorporates means to hang the containers via the bail from an existing elevated structure to complete the present hanging system.

7 Claims, 9 Drawing Sheets

PLANT GROWING SYSTEM AND KIT AND METHOD FOR SAME

FIELD OF THE INVENTION

The present invention relates, in general, to container growing of plants and, more particularly, this invention relates to a tilted hanging system and method for enhanced growing of vegetables, especially tomatoes.

PRIOR ART

Bilstein in U.S. Pat. No. 4,791,755 discloses a water-permeable soil container placed inside an open-top water-retaining pot. The orientation of both is the typical vertical wall and horizontal bottom. Otake in U.S. Pat. No. 5,829,193 teaches an inner plant container inside an outer semi-spherical container hung by chains. This along with many others are water permeable, and the plant grows up vertically only. Oliver in US published application 2009/0158653 discloses a hanging tomato plant growing container with a bottom aperture that also allows the plant to grow out the bottom, but the container inhibits upward growth. Also, water tends to leak out the bottom and plant's soil dries out quickly. Mendes in U.S. Pat. No. 5,333,409 discloses a hanging tomato-growing container with side tubes angled downward with plants growing out of each. This along with Oliver and others suffer from the serious drawback of how to initially transplant the tomato plant into it. Planting seeds is out of the question.

BACKGROUND OF THE INVENTION

Prior to the conception and development of the present invention, gardeners growing tomatoes had a few problems facing them. Most have been growing them in a plot of soil. Supporting the plants off the ground as they grow taller is one concern, and there have long been commercial products and patents addressing that. There are cages of all sorts, poles with ties, and other structures. Weeds have been another problem for in-ground growers. A third problem that appears to be getting worse in recent years is attacks by animals, mostly deer and groundhogs. Fencing is the most common "solution", but that creates an additional expense and maintenance issue. Also, groundhogs and rabbits can go under fences and deer can sometimes reach or jump over them. A fourth problem is maintaining adequate moisture.

Container growing of tomatoes has become more popular, and a myriad of products, many expensive, are now on the market. There have been articles and products teaching growing from the side or bottom of a container, such as the TopsyTurvy®. These suffer from two major deficiencies in that much of the water added to the container escapes shortly out the bottom or side, and getting the tomatoes plant securely into the container without damage is another issue. Clearly, it would be advantageous to have an apparatus or system addressing all the major problems of support, animal protection, weeds, and water retention.

SUMMARY OF THE INVENTION

The present invention overcomes limitations, deficiencies, and cost issues of the prior art by providing a system, the present apparatus in combination with a tall structure, of growing a wide variety of tall vegetable plants in a container configured to tilt with a specific range. The present growing system for a potted vegetable plant is generally a liquid-impervious outer container and an optional soil-containing water-permeable inner container. Preferably, the liquid-impervious outer container is a pail (bucket) with a pivoting bail (handle) and configured to hang with the pail tilted with its bottom plane at an angle of 20 to 40 degrees from horizontal. The system also incorporates means to hang the bail from an elevated structure (not part of the invention).

In other embodiments, the liquid-impervious outer container is supported by attaching at least four elongated suspension members adjacent the outer edge of the outer container, at least two of which are longer than the other such as to create a tilt of the outer container. The elongated suspension members are one of chains, ropes, cords or straps with clips or hooks on at least one end.

OBJECTS OF THE INVENTION

It is, therefore, one of the primary objects of the present invention to provide a low-cost system for growing tall tomato plants in a container without cages, poles, ties, nets or the like.

Another object of the present invention is to provide a portable system for growing tomatoes that can be started indoors then moved outside, and later could still be moved back indoors.

Still another object of the present invention is to provide a system for growing plants in hanging containers that provides a substantial reservoir of water.

Yet another object of the present invention is to provide a plant-growing system that inherently offers protection from most animals without fences, nets, or the like.

An additional object of the present invention is to provide a versatile system for growing a variety of plants in locations close to apartments or other residences lacking an available plot of soil.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, very similar components which have identical functions have been identified with identical reference numerals throughout the several views illustrated in the drawing figures.

Figure 1:
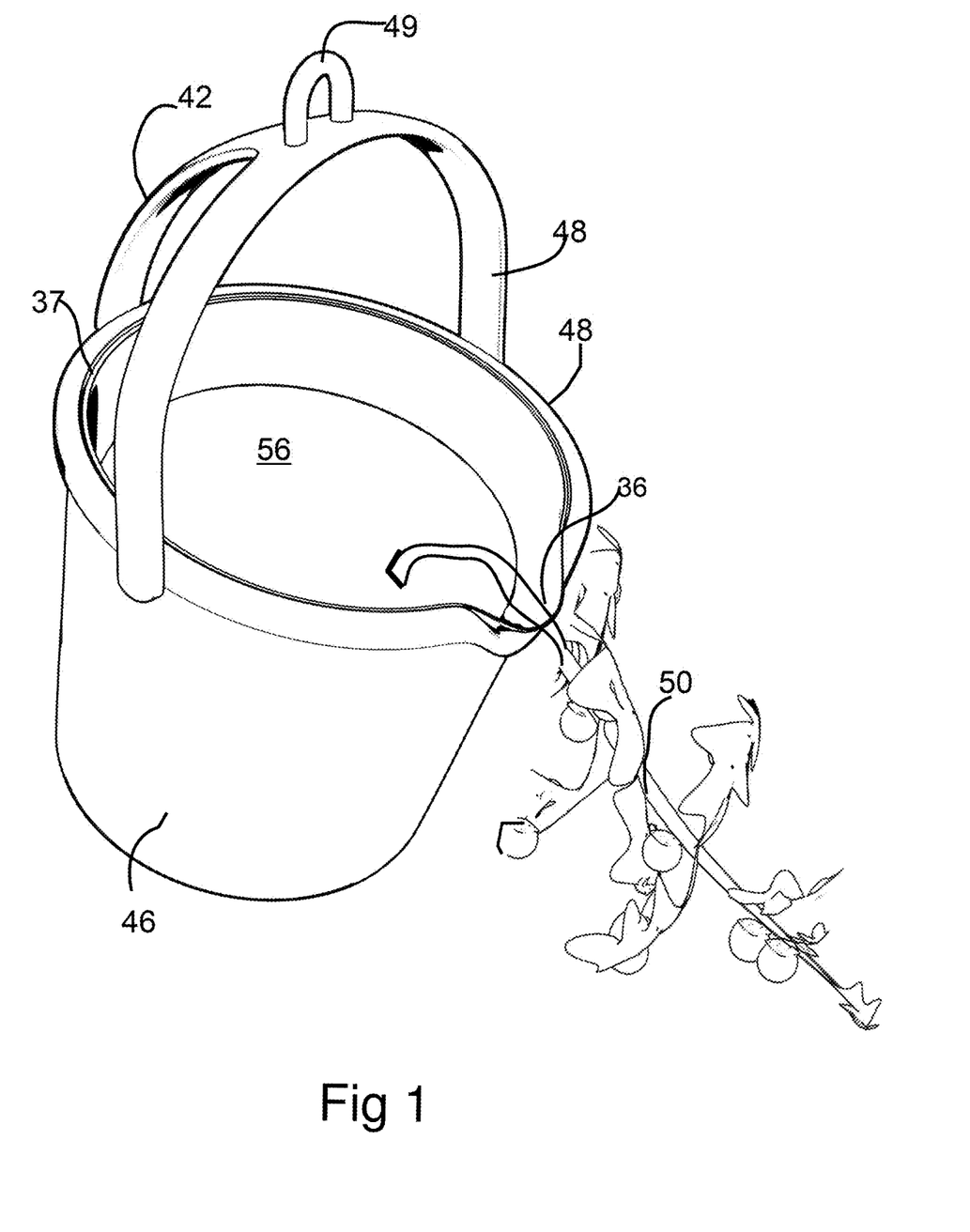
FIG. 1 provides a perspective view of a preferred embodiment of the present invention.
Figure 5:
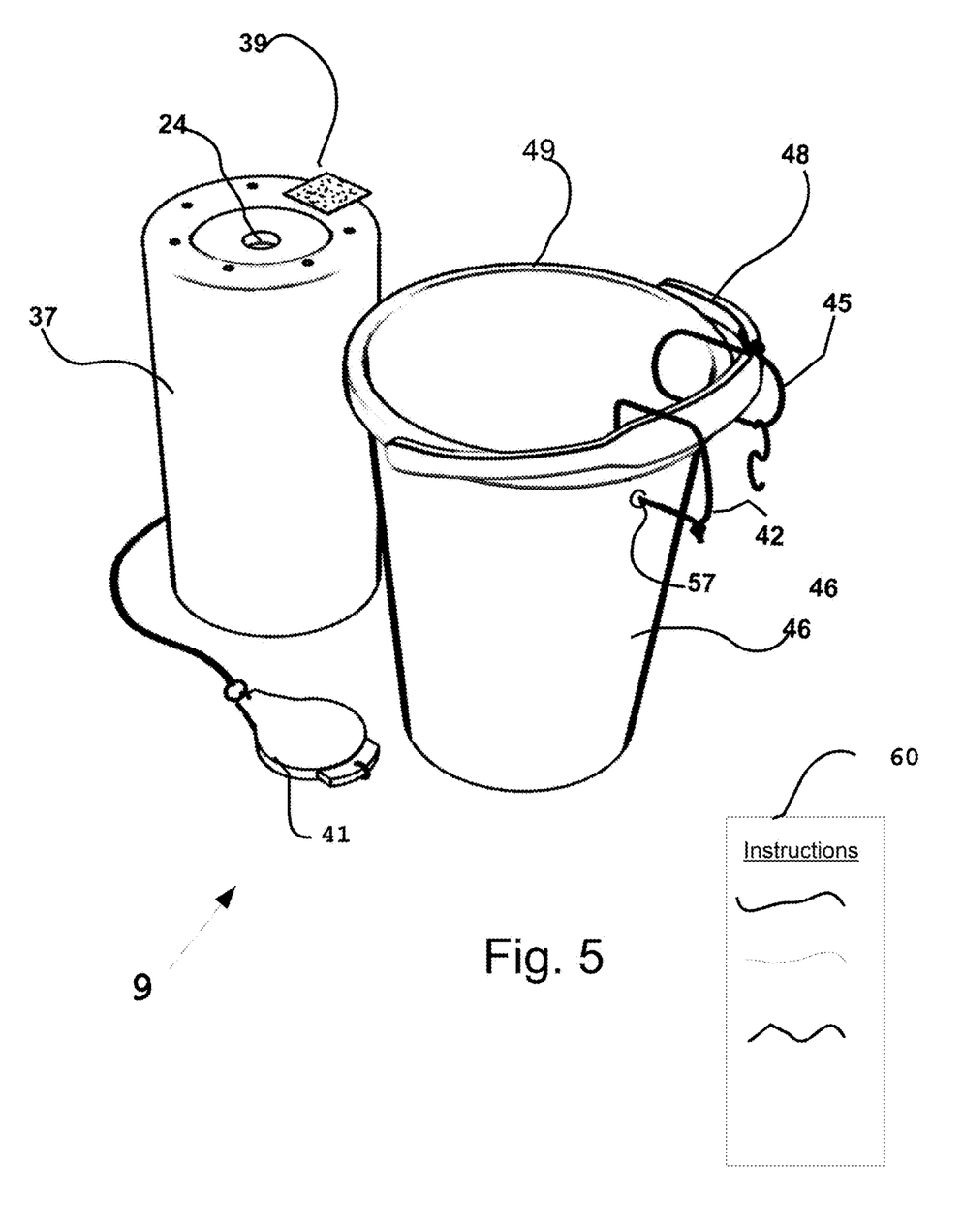
FIG. 5 is a perspective view of a kit for assembling a preferred embodiment of the present invention.

Referring initially to FIG. 1, this provides a perspective view of a preferred embodiment of the present invention generally shown as 10. Herein, a tether cord or strap 42 connects the rim 49 of the pail 46 at an aperture 41 adjacent the rim 49 to the bail such as to limit the rotation of the bail 48. The rotation-limiting tether 42 can be a rigid member as shown, or a flexible cord loop as shown in FIG. 5. The apparatus can be hung from above utilizing a cord loop 45, but other suspension means would be acceptable. The notch 36 or a pail spout is an optional element in that helps induce downward growth and minimizes the risk of damage to the plant 50 as it grows and hangs downward. The pail should have a minimum height of 20 centimeters.

Figure 2:
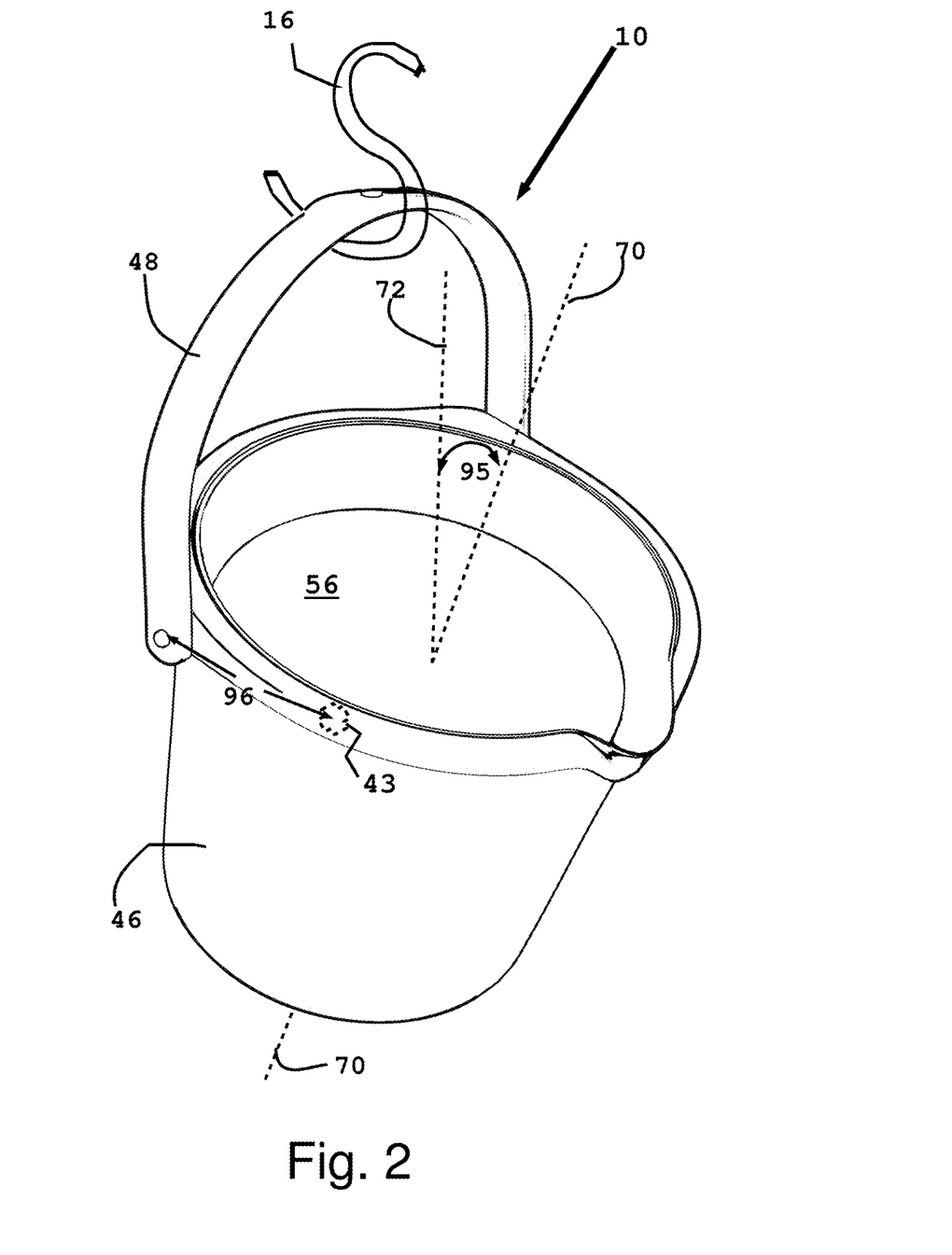
FIG. 2 is a side perspective view of an alternative embodiment similar to that of FIG. 1.

FIG. 2 provides a perspective view of an alternative embodiment 6 of the present invention also configured to create tilt of a pail upon hanging. An open-top water-impervious container 46, such as a pail as shown, holds a quantity of plant soil 56 just below the upper rim. The pail container 46 generally has a bail (handle) 48, which in this embodiment, is attached adjacent the upper rim, but at two apertures displaced a distance 96 from the conventional widest point 43 such that the center-of-gravity when hung by the bail is not directly below the bail 48. The shorter separation of the apertures along the circumference is between 30 and 40 percent of the total circumference. In this configuration, the tilt of the pail 46 is accomplished without a tether element around the bail 48 as shown in FIG. 1. Instead, the ends of the bail 48 are attached to the pail below the top rim at two apertures offset by dimension 96 two to four centimeters from the conventional center-of-gravity location 43. The distance along the circumference separating the two apertures is between 80 and 94 percent of the entire circumference. Thus, when the pail is lifted or suspended by the bail 48, it automatically becomes tilted at a significant angle without a tether cord. This configuration causes the pail to tilt such that the longitudinal center line 70 is at an angle 95 to plumb vertical 72 of between 20 and 40 degrees. One exemplary means of hanging by the bail 48 is with an S hook 16 that can be connected above to a structure or a bracket. The tilt angle of the pail is important especially for tomato plants so as to promote downward growth first and upward growth later from the main stem.

Figure 3:
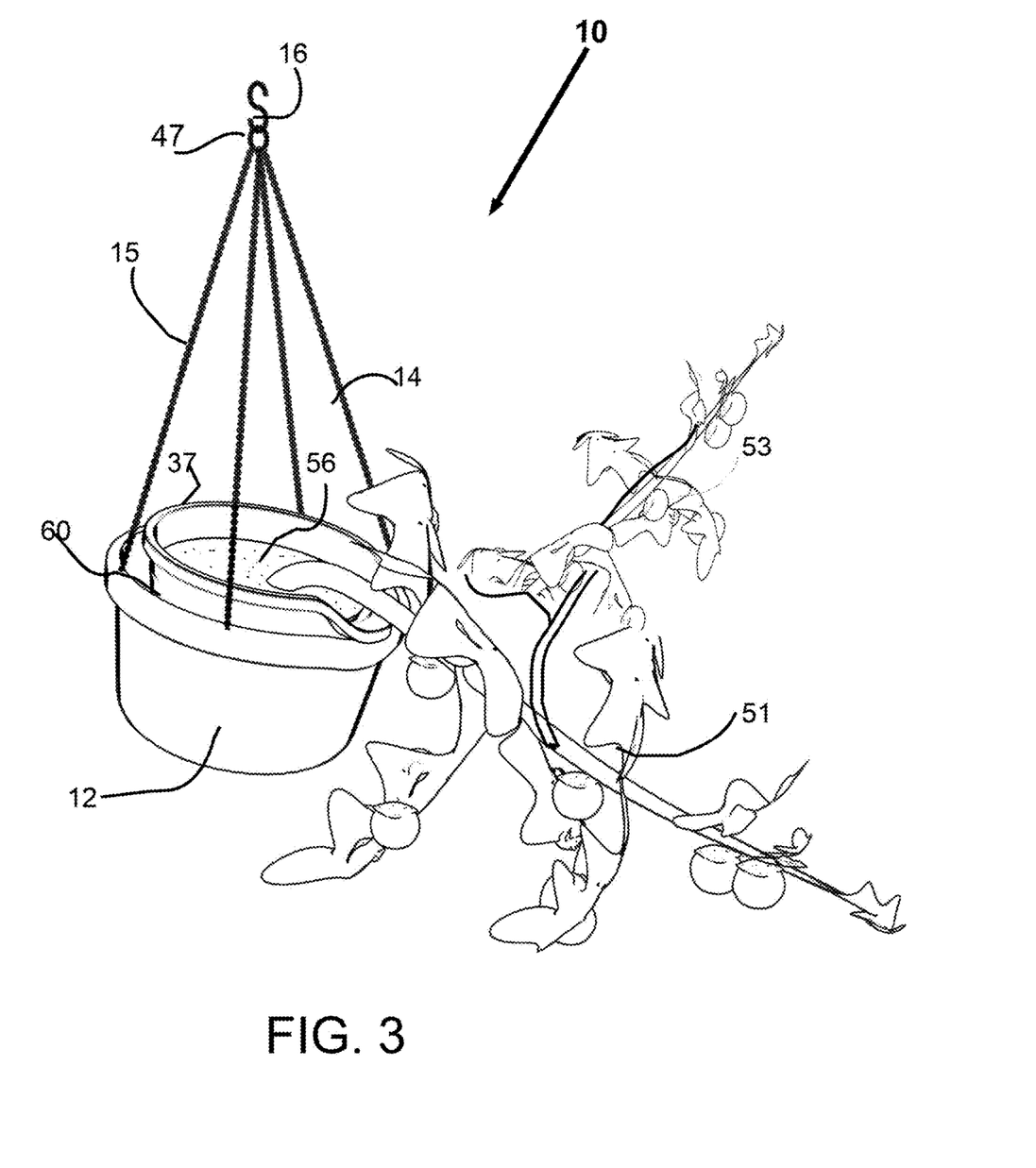
FIG. 3 is a perspective view of a secondary embodiment of the present invention.

FIG. 3 is a perspective view of a secondary embodiment of the present invention. A bowl-like water-impervious container supports and surrounds an inner water-permeable plant pot 37 which holds the soil 56 and plant 50. The container 12 and means of hanging it are configured so as to hang in a tilted position with two suspension members 14, typically chains, that are closer to the front container notch 36 being longer than the back suspension members 15 by about 3 to 8 cm. The four chain lengths generally will start the same, but two then are shortened by using different links in the chain. For this embodiment, the number of suspension members must be exactly four. Typical for most potted plants is three, but in the present case, four are needed for supporting the weight and obtaining the desired tilt. The difference in chain length is such that the bottom plane of the bowl-like container is at a 20 to 40 degree angle to horizontal. If more than 40 degrees, soil may get washed out with watering. If less than 20 degrees, the desired plant growth pattern may not occur. The four suspension members converge at a single loop or hook 47 from which the apparatus will be hung thus completing the present system. As growth progresses, there is a downward-growing portion 51 while still enabling significant vertical growth 53. The bowl-like water-impervious container 12 is sized such that there a substantial reservoir 60 for water that can be drawn into the soil 56 for the plant 50.

Figure 4:
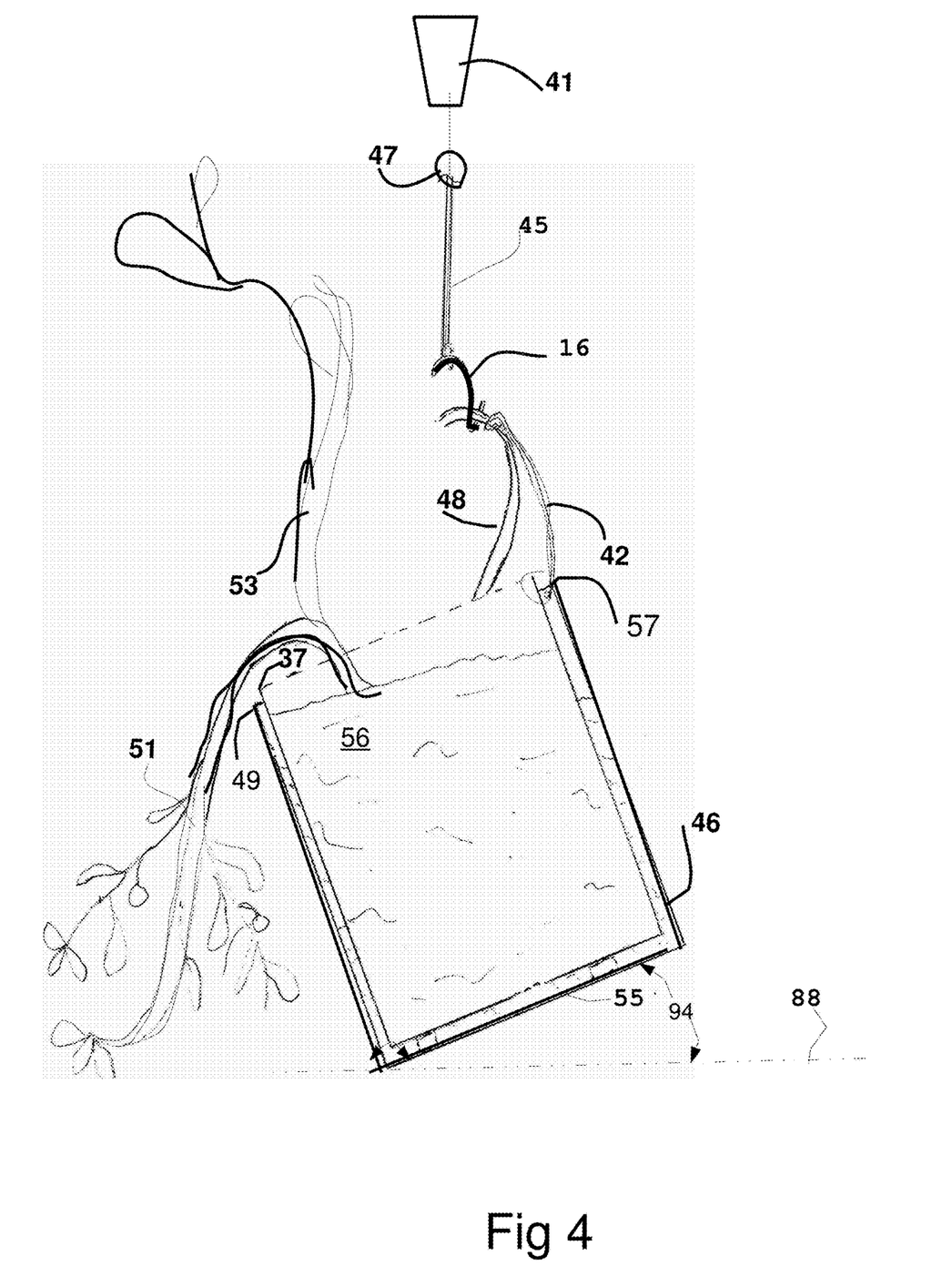
FIG. 4 is a sectional elevation view showing certain details of the present invention.

FIG. 4 provides a sectional view of an alternative means for achieving the tilting configuration of the water-impervious container. The soil 56 is contained within the inner water-permeable liner 37 such that it can obtain water from the top surface or from the annular space between the inner liner 37 and the water-impervious container 46 via the bottom or sides of the water-permeable liner 37. It can also be seen how the tilt of the pail 46 promotes both upward plant growth 53 and downward growth 51. The tilted arrangement surprisingly results in an unexpected large secondary stem 53 off of the downward growing primary stem 51 and often leads to an overall plant height of 5 to 6 feet with no support members such as poles or cages. This does not occur with a standard container planting. When suspended, the plane of the container bottom 55 is at an angle 95 between 20 and 40 degrees, which is set and maintained by the length of the tether cord 42 around the bail 48 and through an aperture 57 in the rim 49. A preferred method of supporting the containers is via an S hook on the bail 48 with the upper end connected to a ring 47 at the end of a retractable pulley 41. The top ring of the pulley 41 is hung from a bracket, or a hook, nail, or screw up on an elevated structure (not shown or part of invention). The retractable pulley 41 makes it convenient to normally keep the plant up high away from animals and also to lower it for maintenance, watering, or harvesting.

FIG. 5 provides a perspective view of a kit 9 configured for assembling the system of the present invention. The water-impervious container is preferably a pail 46 which generally has a handle or bail 48, but it could also be an open top container suspended by four chains as disclosed in FIG. 2. In this kit, the tether 42 is already installed through an aperture 57 near the rim 49 of the water-impervious container and around the bail 48 such as to limit rotation of the bail. The water-permeable inner liner 37 is included but shown in an inverted position to illustrate the bottom apertures. In addition, a retractable pulley hanger 41 is included as is a hanging loop 45 around the bail 48. An optional cover 39 for the bottom center aperture 24 is included for minimizing soil escape. Not shown, but an optional portion of the kit are one or two blocks about 2 to 4 centimeters thick to elevate water-permeable inner liner 37 if needed to have the top rim of the inner liner adjacent the top rim of the water-impervious container 46. The kit also includes a written instruction sheet 60.

Figure 6:
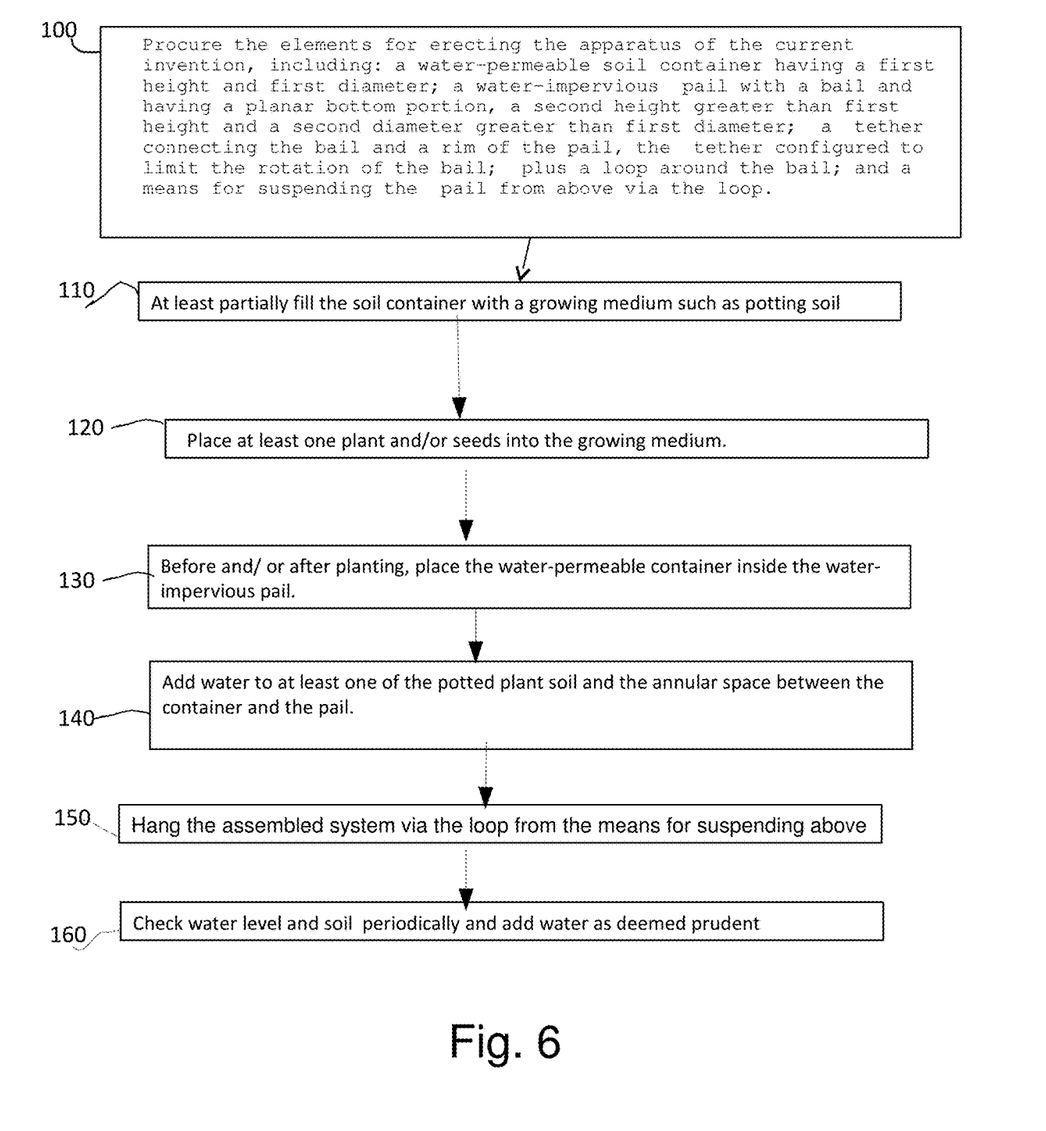
FIG. 6 provides a flow diagram for a basic method of use incorporated into the present invention.

FIG. 6 provides a flow diagram for an exemplative method of use incorporated into the present invention, beginning at 100 with procuring the specified parts of the present invention. The water-permeable inner liner is filled at least partially with soil or other growing medium (step 110) After planting (step 120), the inner liner is placed inside the pail (step 130) and then the pail is hung from an existing structure by available means (step 150). There are occasional maintenance steps thereafter (steps 160-170).

Figure 7:
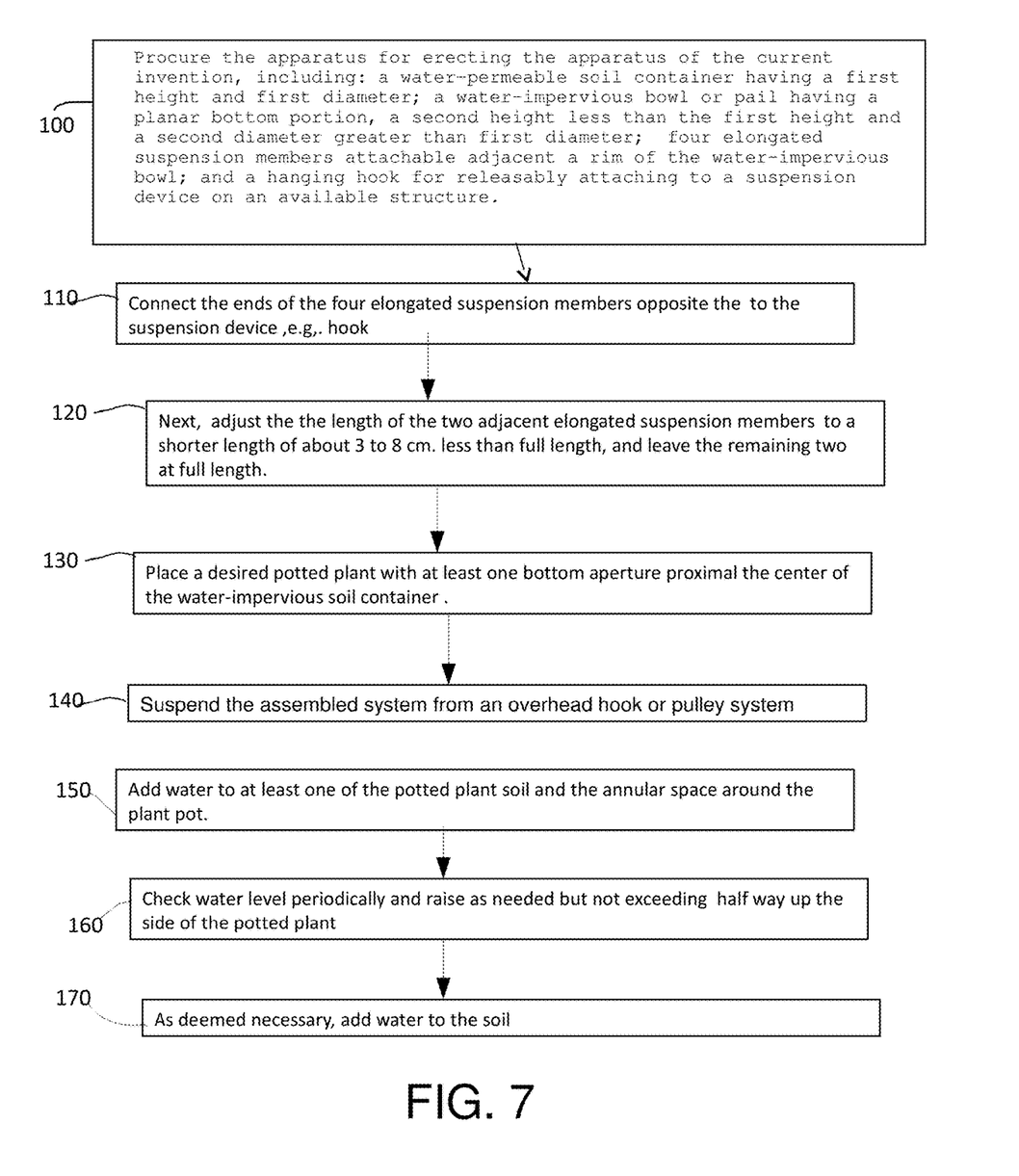
FIG. 7 provides a flow diagram for an alternative method of use incorporated into the present invention.

FIG. 7 provides a flow diagram for an alternative method of use incorporating the apparatus utilizing four suspension members (e.g. chains) into the present invention. It begins with a bowl-like water-impervious container being suspended by four chains, two shorter than the other by 3 to 8 centimeters. The four suspension members all attach to a single loop or hook for eventual hanging from an existing structure. Subsequent steps are essentially the same as for FIG. 6. The plant may be purchased already in a water-permeable pot with growing medium, or it can be subsequently planted in soil within a water-permeable container placed within the supported water-impervious container. The upper four chain ends converge at a common hanging device.

Figure 8:
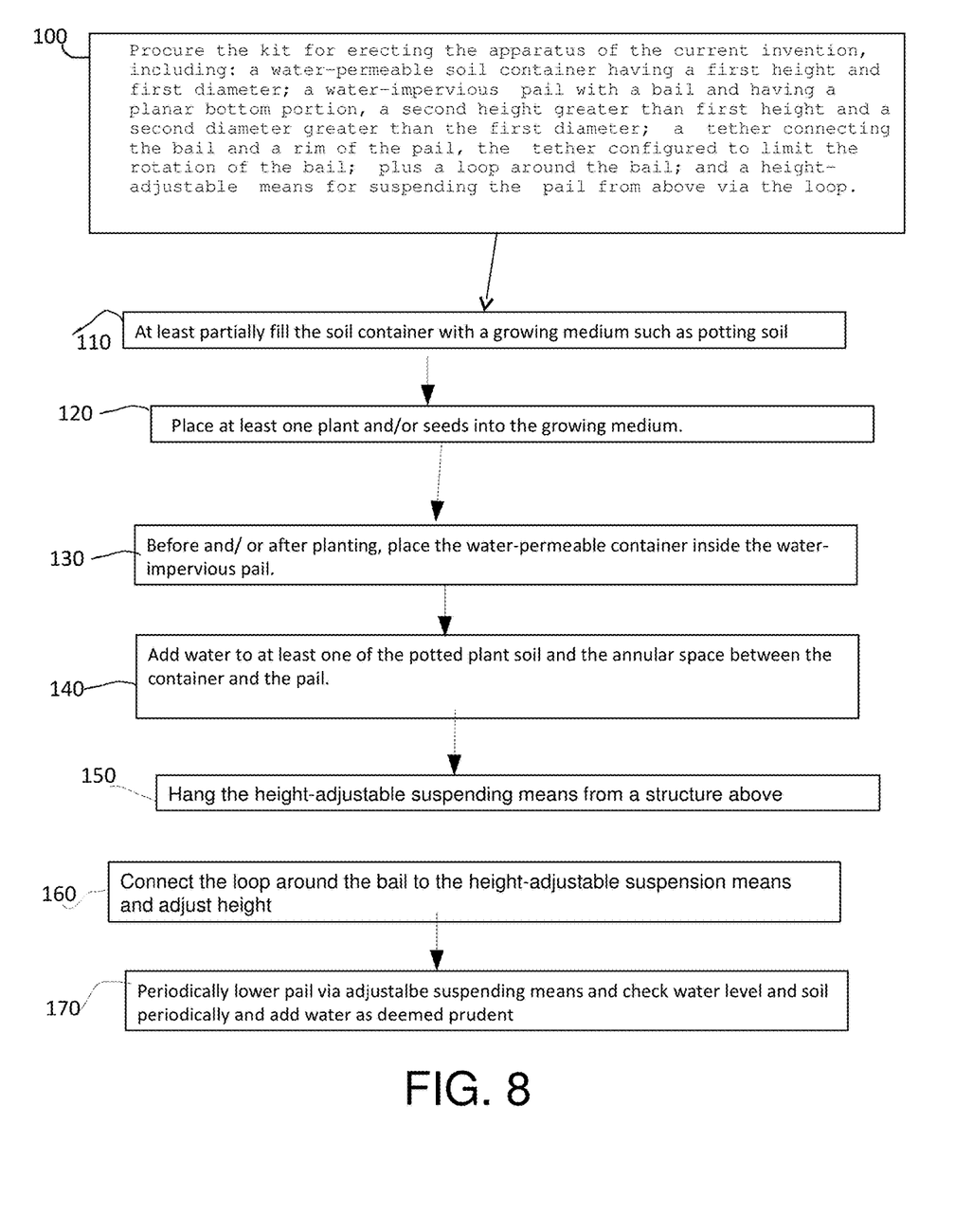
FIG. 8 provides a flow diagram for a variation of the alternative method based on the kit.

FIG. 8 provides a flow diagram for a variation of the alternative method based on procuring the kit, step 100. The water-permeable inner liner is filled at least partially with soil or other growing medium (step 110) Before or after planting (step 120), the inner liner is placed inside the pail (step 130), watered at 140, and then the pail is hung by available means (step 150). There are occasional maintenance steps thereafter (steps 160-170).

Figure 9:
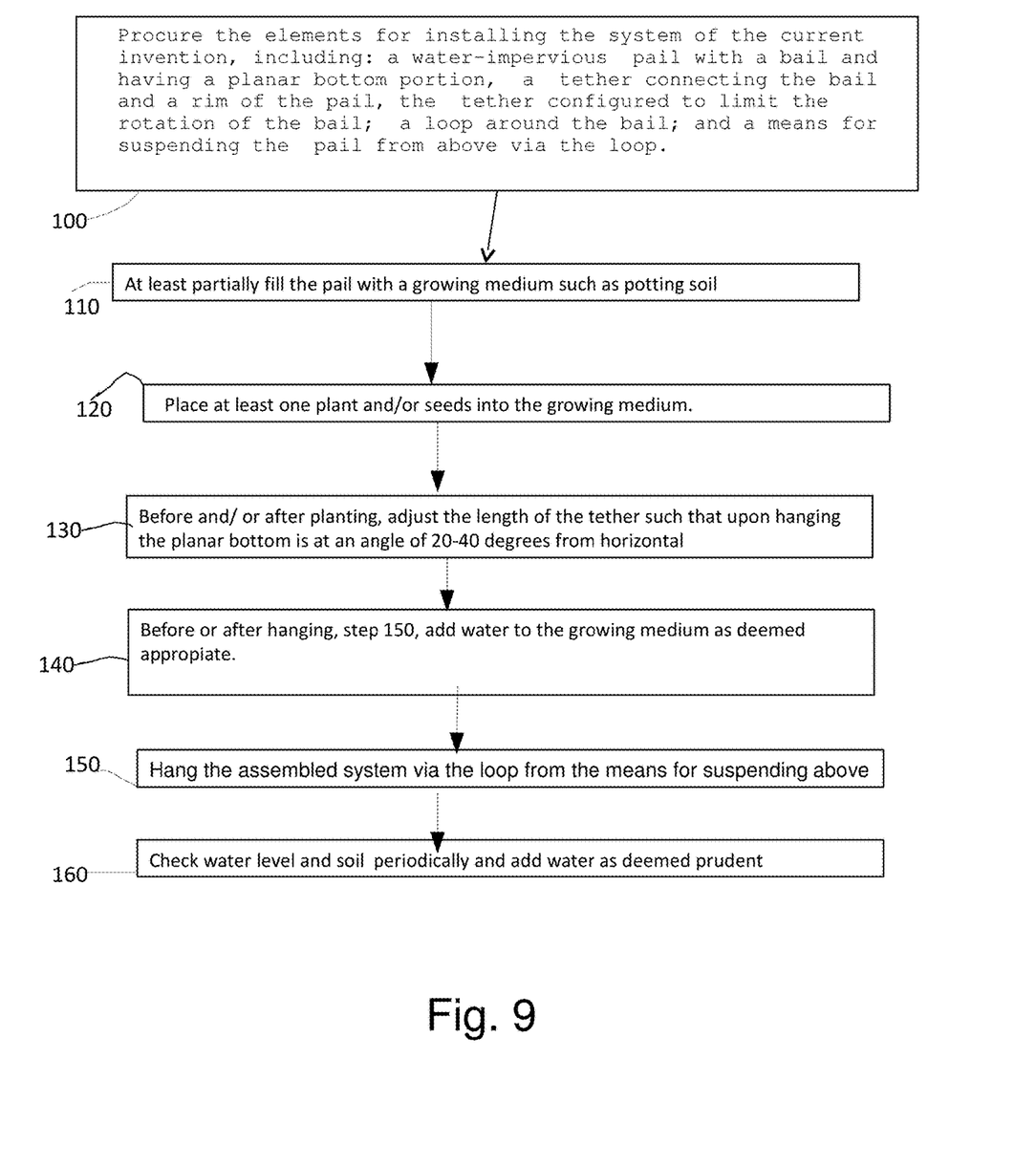
FIG. 9 provides a flow diagram for a variation of the method of FIG. 6, the main difference being that there is no inner container.

FIG. 9 provides a flow diagram for a variation of the method of FIG. 6, the main difference being that there is no inner container. The growing medium (soil) is placed into the water-impervious container and seeds or a vegetable plant placed therein. At step 130, the tether length is adjusted to obtain the tilt angle of 20 to 40 degrees.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from the spirit of the invention.

I claim:

1. A system for erecting a tilted hanging plant container comprising:
   a) an open-top water-impervious pail having a first height and a first diameter, the system further including an open-top water-permeable soil container having a second height less than the first pail height and a second diameter less than the first pail diameter inserted inside the open-top pail;
   b) a bail rotatably engaged to the open-top pail adjacent an upper rim of the open-top pail;
   c) a member connecting the bail and the rim of the pail wherein the connecting member is configured to cause the longitudinal axis of the open-top pail to lie 20 to 40 degrees from plumb upon hanging; and,
   d) a means for suspending the pail from a structure above.

2. The system of claim 1 wherein the first height is at least 20 centimeters.

3. The system of claim 1 wherein the member connecting the bail and the upper rim is a rotation-limiting tether wrapped around the bail and through an aperture adjacent the upper rim of the open-top pail.

4. A kit for erecting a tilted hanging plant container system comprising:
   a) an open-top water-permeable soil container having a first height and a first diameter;
   b) a water-impervious pail having a bail and a second height greater than the first and a second diameter greater than the first diameter;
   c) a tether connecting the bail to the water-impervious pail at an upper rim and configured to restrain rotation of the bail;
   d) a means for suspending the pail from a structure above in combination with a hook; and,
   e) a written instruction sheet.

5. The kit of claim 4 wherein the tether restrains the rotation of the bail such that the axial centerline is between 20 and 40 degrees from plumb vertical when the pail is hung.

6. The kit of claim 4 wherein the tether is one of a rigid or semi-rigid strap.

7. The kit of claim 6 wherein the means for suspending includes a retractable pulley hanger.

\* \* \* \* \*